United States Patent
Shiraiwa

(12) 
(10) Patent No.: US 6,579,042 B1
(45) Date of Patent: Jun. 17, 2003

(54) CUTTER BODY WITH CUTTING INSERTS AND METHODS FOR ASSEMBLING SAME

(75) Inventor: Akio Shiraiwa, Waldwick, NJ (US)

(73) Assignee: Sandvik Inc., Fair Lawn, NJ (US)

( * ) Notice: Subject to any disclaimer, the term of this patent is extended or adjusted under 35 U.S.C. 154(b) by 181 days.

(21) Appl. No.: 09/685,876

(22) Filed: Oct. 11, 2000

(51) Int. Cl.⁷ .......................... B23B 27/16; B23C 5/00
(52) U.S. Cl. ............................ 407/35; 407/43; 407/53
(58) Field of Search ............................ 407/33, 34, 35, 407/43, 47, 48, 53, 102, 103, 104, 105, 113, 114, 115, 116

(56) References Cited

U.S. PATENT DOCUMENTS

| | | | |
|---|---|---|---|
| 3,662,444 A | | 5/1972 | Erkfritz |
| 4,709,737 A | * | 12/1987 | Jonsson .................. 144/208.8 |
| 4,848,979 A | | 7/1989 | Simmons |
| 5,199,828 A | | 4/1993 | Forsberg et al. |
| 5,772,364 A | * | 6/1998 | Satran et al. ................ 407/113 |
| 5,871,309 A | | 2/1999 | Svensson |
| 6,053,671 A | | 4/2000 | Stedt et al. |
| 6,190,095 B1 | * | 2/2001 | Schmidt .................... 407/102 |

* cited by examiner

Primary Examiner—Henry W. H. Tsai
(74) Attorney, Agent, or Firm—Burns, Doane, Swecker & Mathis, LLP

(57) ABSTRACT

Cutting inserts are assembled around the periphery of a holder of a tool by respective fastening screws. Each insert is seated against a support surface, and its respective fastening screw passes through a center hole in the insert and is threaded into a mounting hole formed in the support surface. The mounting hole is oriented non-perpendicularly to the support surface, whereby the fastening screw forms an angle with the axis of the insert's through-hole and is more accessible to a screwdriver. The through-hole has a conical or spherical portion which supports a spherical head of the fastening screw.

18 Claims, 3 Drawing Sheets

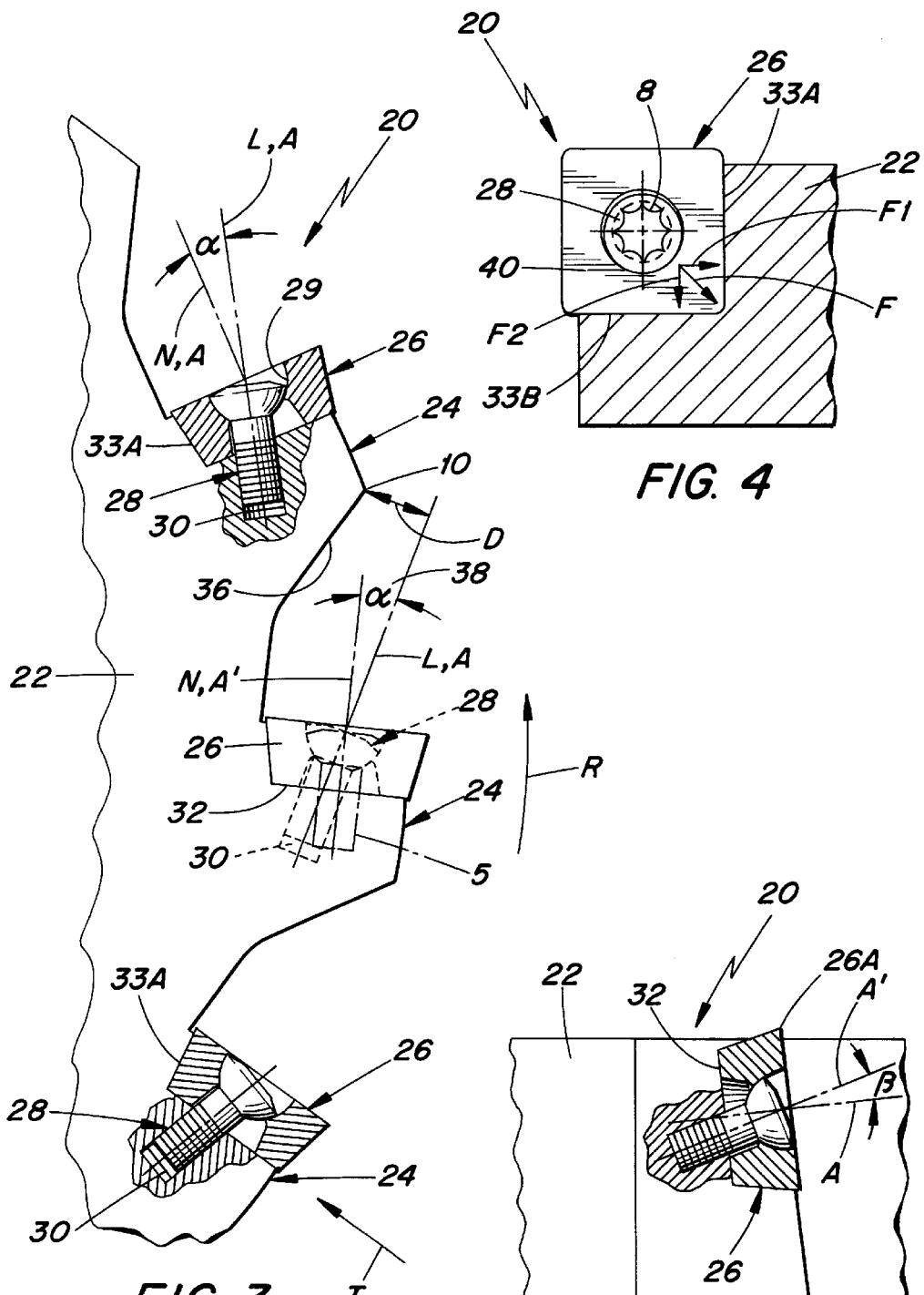

CUTTER BODY WITH CUTTING INSERTS AND METHODS FOR ASSEMBLING SAME

BACKGROUND OF THE INVENTION

The present invention relates to cutting inserts, a method of assembling the cutting inserts on a cutter body, and the assembled cutter body.

Depicted in FIGS. 1 and 2 is a conventional milling cutter comprising a rotatable holder body 1 having a plurality of circumferentially spaced insert seats 2. Mounted in the insert seats are indexible cutting inserts 3 with optional shims 4. The inserts 3 and shims (if provided) are held in place by fastening screws 5 that extend through holes formed in the inserts and the shims. The fastening screws are threadedly attached in threaded holes 6 that are formed in support surfaces 7, the holes 6 extending perpendicularly to the respective surfaces 7. Such a milling cutter is disclosed, for example, in U.S. Pat. No. 5,871,309.

In order to tighten the screws, it is necessary to insert a turning tool into a cavity formed in the screw head. From FIG. 2 it will be appreciated that the center axis A of the screw nearly intersects a radially outer edge 10 of a surface 12 of a pocket 14 that is formed in front of each insert seat 2. That hampers the insertion of a turning tool and requires that special turning tools with long shanks be used to avoid interference of the edge 10 with the tool's handle.

Therefore, it would be desirable to provide a cutting insert mounting arrangement having a fastening screw that is not only readily accessible, but which makes 360 degree contact with the wall of the insert's through-hole while urging the insert simultaneously rearwardly against a supporting surface and laterally against an abutment surface.

Furthermore, it is desirable to secure a cutting insert as snugly as possible in its respective seat so that the insert will not vibrate or chatter. A typical seat possesses not only a rear support surface in which the treaded screw-receiving hole, but also an upstanding abutment surface. By pressing the insert against both the rear support surface, and the abutment surface, the insert is more stabilized and less prone to vibrate or chatter. Various ways have been proposed to enable a fastener screw to press the insert in that manner. For example, as disclosed in U.S. Pat. No. 6,053,671, a fastener screw can be inserted into a threaded hole extending perpendicularly into the support surface, but positioned relative to the abutment surface whereby one portion of a head of the screw will push the insert not only rearwardly against the supporting surface, but also laterally against the abutment surface.

Another technique, disclosed in U.S. Pat. No. 3,662,444 involves orienting the threaded hole non-perpendicularly relative to the supporting surface. Then, when the fastener screw is inserted through the center through-hole of the insert and into the threaded hole, a conical surface on the screw head will bias the insert rearwardly against the supporting surface, and laterally against the abutment surface.

A shortcoming associated with the arrangements described in U.S. Pat. Nos. 6,053,671 and 3,662,444 is that the screw head makes contact with the wall of the insert's through-hole for less than 360 degrees, thereby limiting the amount of stabilization of the insert that can be achieved.

Disclosed in U.S. Pat. No. 5,199,828 is a mounting arrangement for a turning insert which enables the insert to be exchanged without removing the fastening screw. To accomplish that, the center hole formed in the insert has a larger maximum cross section than the head of the screw. In order to enable the screw head to secure the insert in place, the axis of the screw is tilted relative to the axis of the center hole, whereby the screw enters the rear support surface at an oblique angle. That inherently results in the insert being pushed against the abutment surface by the screw head. The screw head contacts the wall of center hole at two diametrically opposed locations, i.e. the contact between the screw head and the insert is non-continuous, so insert stability is not maximized.

SUMMARY OF THE INVENTION

The present invention relates to a cutting assembly, a method of mounting a cutting insert to a tool holder of the assembly, and to the insert per se.

The cutting assembly comprises a tool holder which has an insert seat. The insert seat includes a seat surface into which a screw-threaded mounting hole extends in a direction obliquely to a plane of the seat surface. A cutting insert is mounted in the seat. The insert has a front surface and a rear supporting surface oriented parallel to the seat surface. The insert has a through-hole defining a center axis and including a front cavity disposed at the front surface of the insert. The front cavity is defined by a wall, at least a screw-supporting portion of which has a circular cross-section and tapers toward the rear supporting surface. A fastening screw extends through the through-hole and includes a threaded shank, and an enlarged head which is disposed in the cavity. The head includes an outer face configured as part of a sphere which makes 360 degree contact with the screw-supporting surface of the cavity wall. The threaded shank is threadedly mounted in the mounting hole. The head and shank are shaped symmetrically about the center axis of the screw. The center axis of the screw forms an acute angle with the center axis of the through-hole.

Preferably, the insert seat includes an abutment surface extending outwardly from the seat surface, the screw-mounting hole oriented so that the screw applied to the insert a force having a component directed toward the abutment surface.

Preferably, the center axis of the screw extends forwardly from the screw in the direction of rotation and diverges from the center axis of the through-hole in a direction away from the axis of rotation.

The invention also pertains to the method of mounting the cutting insert to the insert seat.

The invention also pertains to the cutting insert per se.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 3 is a view similar to FIG. 2 of the presently claimed invention;

FIG. 4 is a front view of a cutting insert mounted in a milling cutter of FIG. 3;

FIG. 5 is a fragmentary side elevational view taken in the direction of arrow T in FIG. 3;

DETAILED DESCRIPTION OF PREFERRED EMBODIMENTS OF THE INVENTION

Figure 1:
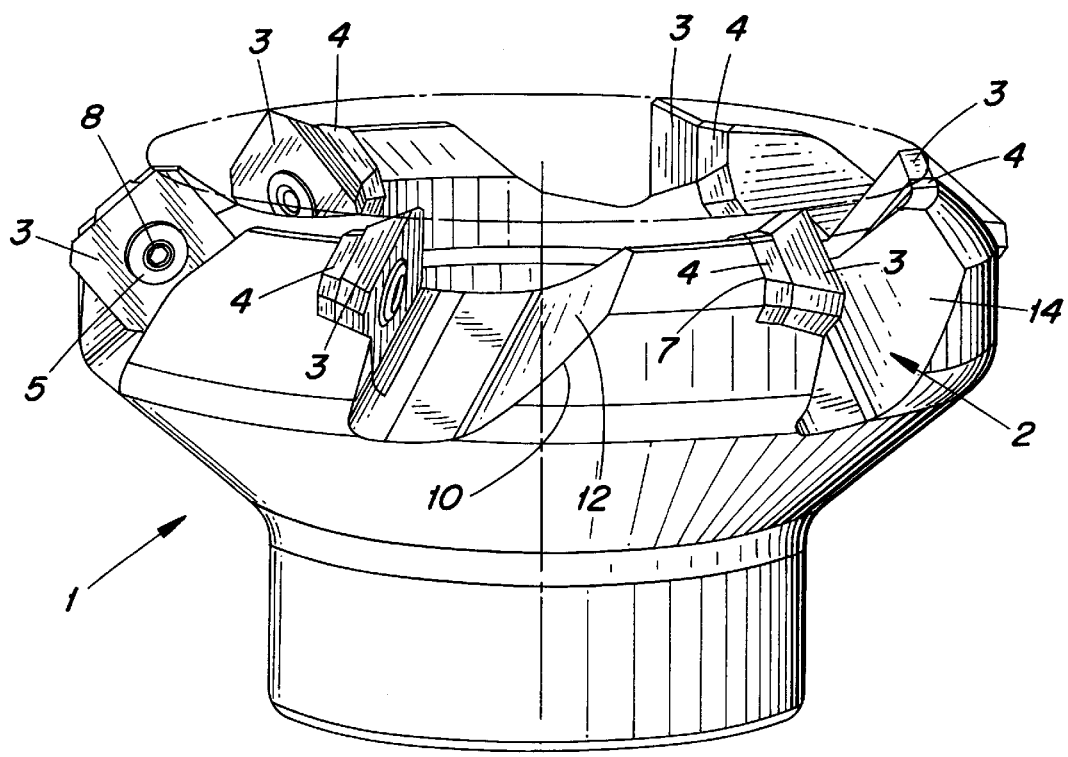
FIG. 1 is a perspective view of a prior art milling cutter.
Figure 2:
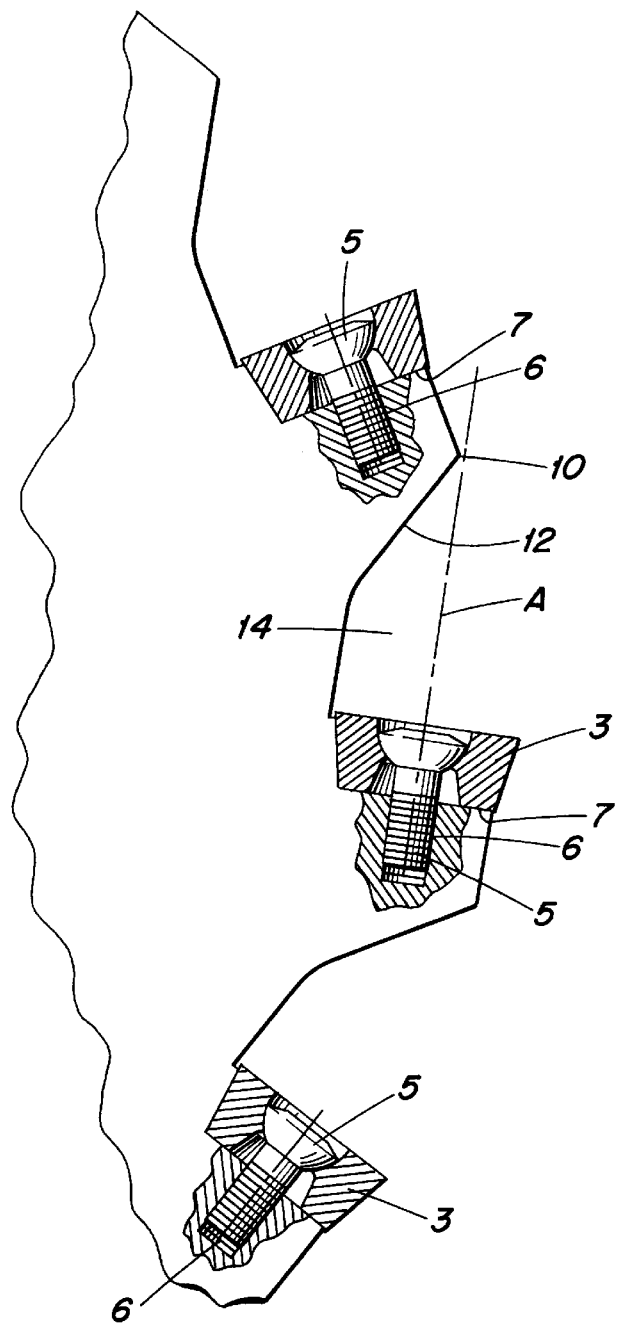
FIG. 2 is a schematic end view of the milling cutter depicted in FIG. 1, with portions thereof broken away.

A rotatable tool 20 in the form of a milling cutter is depicted in FIGS. 3–5. That tool comprises a holder body 22 having a plurality of circumferentially spaced insert seats 24. Each seat 24 includes a rear support surface 32 and an upstanding abutment surface 33 comprised of mutually angled segments 33A, 33B (see FIG. 4). Mounted in at least most of the insert seats are indexible cutting inserts 26, with optional shims not being depicted. Each insert 26 is indexible in that it comprises multiple, selectively deployable cutting edge portions. The inserts 26 (and shims if provided) are held in place by means of fastening screws 28 that extend through center through-holes 29 formed in the inserts 26 (and shims if provided). The fastening screws 28 are threadedly attached in threaded mounting holes 30 that are formed in support surfaces 32 of the seats 24.

The holes 30 extend non-perpendicularly relative to the respective surfaces 32. That is, as shown in FIG. 3, the holes 30 lie along respective axes L that are inclined obliquely relative to a line N that is normal to the seat surface 32, the axis L forming an acute angle α with the normal N. The angle α is arranged such that the axis L, as it extends forwardly from the screw 28 in the direction of rotation R, diverges from the normal N in a direction away from the center of the tool and thus is spaced from the outer end 10 of a surface 36 of a pocket 38 formed in front of each insert slot by a distance D that is considerably larger than in the prior art. A prior art screw 5, which is directed perpendicular to the surface 32 along the normal N, is shown in broken lines in FIG. 3 for comparison purposes. It will thus be appreciated that the screw 28 is more accessible than in the prior art, making it easier to be inserted and removed using a wider variety of turning tool sizes.

Furthermore, this advantage is accomplished without having to change the orientation of the through-hole 29 formed in the cutting insert, i.e., without having to slant the center axis L' of that hole obliquely relative to the front face 40 of the insert. Rather, the through-hole 29 is symmetric with respect to a line normal to the front face 40, as in the prior art. That symmetrical configuration is made possible by providing the through-hole 29 with enlarged front and rear cavities 50 and 52 at front face 40 and the rear support face 41 of the insert (see FIG. 6).

Figure 6:
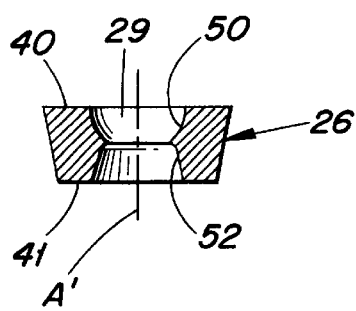
FIG. 6 is a longitudinal sectional view taken through a cutting insert according to the presently claimed invention.
Figure 7:
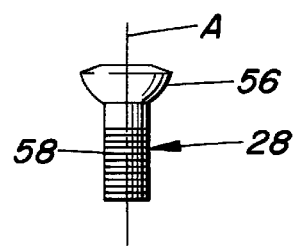
FIG. 7 is a side elevational view of a fastening screw utilized in the present invention.
Figure 8:
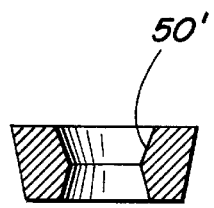
FIG. 8 is a sectional view taken through an insert, wherein a cavity of the insert has an alternative shape.

The front cavity 50 is formed by a wall, at least a portion of which supports the head of a screw in a manner enabling the screw to be oriented such that the screw axis A does not coincide with the axis L of the hole 30, i.e., such that the axis A can form an angle with the axis L. Thus, the head-supporting portion of the front cavity 50 should have a circular cross section, which tapers (narrows) toward the rear cavity 52. For example, that head-supporting portion could be spherical as shown in FIGS. 3, 5 and 6, or conical as shown at 50' in FIG. 8. As used herein, the expression "conical surface" includes a surface that comprises a portion of a complete cone (i.e., frusto-conical), and similarly, "spherical surface" includes a surface that comprises a portion of a complete sphere.

The screw 28 has a head 56 and an externally screw-threaded shank 58 extending from the head. The head has a larger maximum cross section than the through-hole 29, requiring that the screw be completely removed from the mounting hole 30 in order to exchange the cutting insert. The screw is shaped symmetrically about a longitudinal center axis A of the screw. The head includes an outer face shaped adapted to make contact with the head-supporting portion of the front cavity 50. If that head-supporting portion is conical, then the head will make line-to-line contact therewith. If the head-supporting portion is spherical having a radius equal to the radius of the spherical surface of the head 56, then surface-to-surface contact will occur, but if the radii are different, then line-to-line contact will occur. The line-to-line (or surface-to-surface) contact will be coaxial (symmetrical) with respect to the axis of the screw and will occur for 360 degrees around that axis. Thus, the force applied by the screw to the insert will have a more stabilizing effect.

It is noted that it is not necessary for the entire outer face of the screw to be spherical, but rather only a portion thereof that is to be in 360 degree contact with the surface of cavity 50.

The direction of the threaded hole 30 is such that the force applied from the screw to the insert includes a lateral component(s) directed toward the abutment surface 33A, 33B. Thus, for example, as can be seen in FIG. 4, the inserted screw is oriented to impose a force F on the insert in a direction so as to have components F1, F2 directed toward respective segments 33A, 33B of the abutment surface. The combination of those forces together with the 360 degree contact between the screw head and the wall of the insert's through-hole will have a highly stabilizing effect on the insert for resisting vibration and chatter. This aspect of the invention has utility regardless of whether easy access to the screw head is or concern, such as in the case of the milling cutter described earlier. That is, the improved stability feature can be used with all inserts that utilize fastening screws in rotary or stationary holders.

It will be appreciated that the abutment surface can comprise more or less than one segment. The abutment surface could be curved in lieu of comprising planar segments.

The rear cavity 52 of the insert is of gradually increasing cross section toward the support surface 41 in order to accommodate slanting of the screw 28 relative to the insert axis A'. Preferably, the shape of the rear cavity is frusto-conical.

It would be possible for the hole 6 to be so oriented that the angle α lies in a plane oriented perpendicularly to the axis of rotation of the tool 20, wherein both the axis A of the screw and the center axis A' of the insert lie in such plane. However, it is alternatively possible, as shown in FIG. 5, to form the hole such that the axes A and A' lie in a plane oriented obliquely relative to the axis of rotation, i.e., wherein the axis A is inclined relative to the axis A by an acute angle β as the tool is viewed in a direction T perpendicularly to the axis of rotation. Regardless of whether both of the axes A, A' lie in a plane oriented perpendicularly or obliquely to the axis of rotation, the insert and screw would appear as shown in FIG. 3 when viewed in a direction parallel to the axis of rotation, i.e., the axes L and A would diverge relative to the axis A' to form the distance D. The angle β (if present) would be so oriented that the axis A, as it extends forwardly from the head of the screw, would diverge from the axis A' in a direction parallel to the axis of rotation and toward the active cutting edge portion 26A as shown in FIG. 5.

It will be appreciated that the present invention provides a more stabilized cutting insert and enables a fastening screw to be more accessible to a screwdriver.

Although the insert has been depicted as having its rear support surface 41 in direct contact with the seat surface 32, there could instead be provided a shim between those surfaces, similar to the shim 4 of FIG. 1.

The insert can be of any desired shape such as polygonal or round.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting assembly comprising:
   a tool holder having an insert seat, the insert seat including a seat surface into which a screw-threaded mounting hole extends in a direction obliquely to the seat surface;
   a cutting insert mounted in the seat, the insert having a front surface and a rear supporting surface oriented parallel to the seat surface, the insert having a through-hole defining a center axis and including a front cavity disposed at the front surface of the insert, the front cavity defined by a wall, at least a screw-supporting portion of the wall having a circular cross section which tapers toward the rear supporting surface; and
   a fastening screw extending through the through-hole, the screw including a threaded shank, and an enlarged head disposed in the cavity, the head including an outer face configured as part of a sphere which makes 360 degree contact with the screw-supporting portion of the cavity wall, the threaded shank threadedly mounted in the mounting hole, the head and shank being shaped symmetrically about the center axis of the screw, a maximum cross section of the head being larger than a minimum cross section of the through-hole, the center axis of the screw forming an acute angle with the center axis of the through-hole.

2. The cutting assembly according to claim 1 wherein the 360 degree contact is coaxial with the screw-supporting portion of the cavity wall.

3. The cutting assembly according to claim 1 wherein the seat further includes an abutment surface extending outwardly from the seat surface, the mounting hole oriented such that the screw applies a force to the insert having a component directed toward the abutment surface.

4. The cutting assembly according to claim 3 wherein the abutment surface comprises two segments angled perpendicularly relative to one another, the force having components directed perpendicularly toward respective ones of the segments.

5. The cutting assembly according to claim 1 wherein the tool holder defines an axis of rotation, the front surface of the insert facing forwardly in a direction of rotation of the tool holder.

6. The cutting assembly according to claim 5 wherein the center axis of the screw extends forwardly from the screw in the direction of rotation and diverges from the center axis of the through-hole in a direction away from the axis of rotation.

7. The cutting assembly according to claim 6 wherein the center axis of the screw extending forwardly from the screw in the direction of rotation also diverges from the center axis of the through-hole in an additional direction parallel to the axis of rotation.

8. The cutting assembly according to claim 7 wherein the additional direction is also toward an active cutting edge of the insert.

9. The cutting assembly according to claim 1 wherein the through-hole further includes a rear cavity disposed at the rear supporting surface, a cross section of the rear cavity becoming enlarged in a direction away from the front cavity.

10. The cutting assembly according to claim 9 wherein the rear cavity is of frusto-conical shape.

11. The cutting assembly according to claim 1 wherein the rear supporting surface of the insert makes direct contact with the seat surface.

12. The cutting assembly according to claim 1 wherein the screw-supporting portion of the cavity wall is spherical.

13. The cutting assembly according to claim 1 wherein the screw-supporting portion of the cavity wall is conical.

14. The cutting assembly according to claim 1 wherein the cutting insert comprises an indexible insert having multiple selectively deployable cutting edge portions.

15. The cutting assembly according to claim 2 wherein the tool holder comprises a rotary body defining an axis of rotation; there being a plurality of the insert seats formed in an outer periphery of the body and spaced apart in a circumferential direction with respect to the axis of rotation, and a plurality of the cutting inserts mounted in respective insert seats; the seat surface of each insert seat facing generally forwardly in a direction of rotation of the body; each insert seat including a wall structure separating adjacent insert seats from one another; the wall structure extending toward an outer periphery of the body to a position in front of a respective insert seat with reference to the direction of rotation; the center axis of the screw extending forwardly from the insert diverging from a center axis of the respective through-hole in a direction away from the axis of rotation.

16. A method of mounting a cutting insert to an insert seat of a tool holder, the insert seat including a seat surface into which a screw-threaded mounting hole extends in a direction obliquely to the seat surface; the cutting insert having a rear supporting surface and a through-hole extending completely through the insert, the through-hole including a front cavity disposed at a front surface of the insert opposite the rear supporting surface, the front cavity defined by a wall, at least a screw-supporting portion of the wall having a circular cross section which tapers toward the rear supporting surface; the method comprising the steps of:
   A. providing a fastening screw including a threaded shank and an enlarged head, the head including an outer face configured as part of a sphere which contacts the screw-supporting portion of the cavity wall, the head having a maximum cross section larger than a minimum cross-section of the through-hole of the insert, the threaded shank defining a center axis about which the screw is shaped symmetrically;
   B. positioning the insert in the insert seat with the rear supporting surface oriented parallel to the seat surface; and
   C. inserting the screw through the through-hole, and threading the shank into the mounting hole, wherein the enlarged head is situated in the cavity with the outer face thereof in 360 degree contact with the screw-supporting wall portion of the cavity, the center axis of the screw extending forwardly from the screw and forming an acute angle with the center axis of the through-hole.

17. The method according to claim 16 wherein the 360 degree contact is coaxial with respect to a center axis of the screw following the threading-in of the shank in step C.

18. The method according to claim 16 wherein the tool holder comprises a rotary body defining an axis of rotation; there being a plurality of the insert seats formed in an outer periphery of the body and spaced apart in a circumferential direction with respect to the axis of rotation, and a plurality of the cutting inserts mounted in respective insert seats; the seat surface of each insert seat facing generally forwardly in a direction of rotation of the body; each insert seat including a wall structure separating adjacent insert seats from one another; the wall structure extending toward an outer periphery of the body to a position in front of a respective insert seat with reference to the direction of rotation; wherein the center axis of the screw extends forwardly from the insert diverging from a center axis of the respective through-hole in a direction away from the axis of rotation following the threading-in of the shank in step C.

* * * * *